No. 819,235. PATENTED MAY 1, 1906.
W. A. LORENZ.
HERMETIC CLOSURE FOR RECEPTACLES.
APPLICATION FILED NOV. 17, 1904.

Witnesses:
H. Mallner
Jas. W. Green

Inventor
William A. Lorenz
By W. H. Honiss, Att'y.

UNITED STATES PATENT OFFICE.

WILLIAM A. LORENZ, OF HARTFORD, CONNECTICUT.

HERMETIC CLOSURE FOR RECEPTACLES.

No. 819,235.　　　Specification of Letters Patent.　　　Patented May 1, 1906.

Application filed November 17, 1904. Serial No. 233,086.

*To all whom it may concern:*

Be it known that I, WILLIAM A. LORENZ, a citizen of the United States, and a resident of Hartford, in the county of Hartford and State of Connecticut, have invented certain new and useful Improvements in Hermetic Closures for Receptacles, of which the following is a full, clear, and exact specification.

This invention relates to improvements in closures for the hermetic sealing of jars, tumblers, and other receptacles; and it consists in improved means whereby the cap and the gasket are combined, so that the latter is secured against displacement during handling and sealing.

Although applicable to many styles of receptacles, the invention is here shown and described in connection with an ordinary glass tumbler as an example of a useful type of receptacle with which the invention may be advantageously employed.

Figure 3:
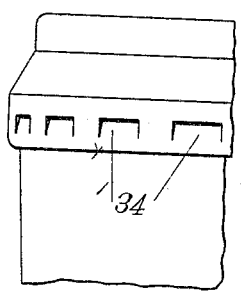
Figure 1:
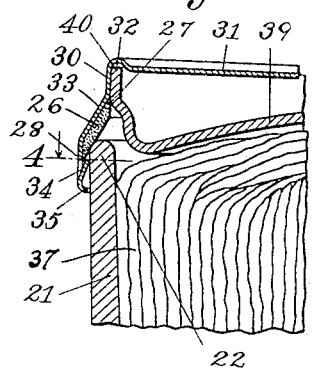
Figure 2:
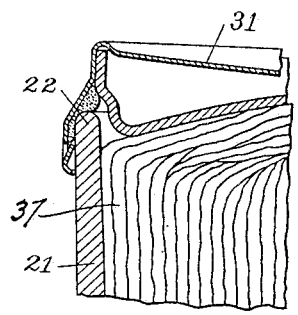
Figure 4:
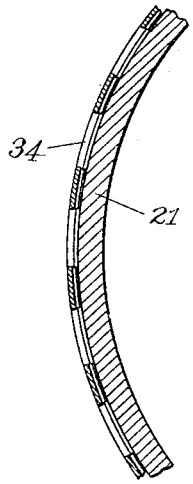
Figure 5:
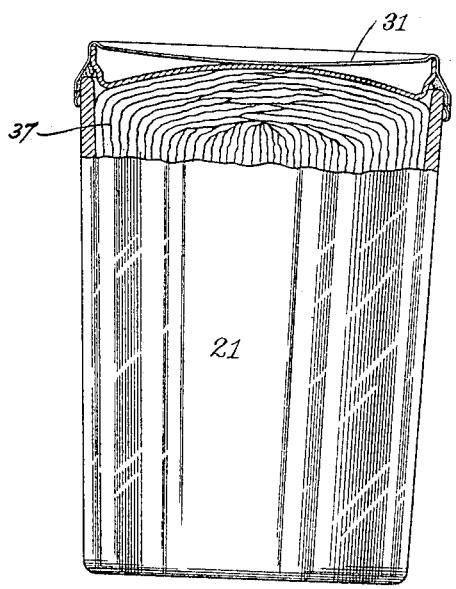

Figures 1 and 2 are fragmentary sectional side views of the top of a tumbler with its gasket and cap, Fig. 1 showing the closure in its loose or air-expelling position, while Fig. 2 shows the closure pushed down to its sealed position. Fig. 3 is a fragmentary side view similar to Fig. 1 and shows the outward appearance of the cap. Fig. 4 is a sectional view, in enlarged scale, of a part of the gasket and cap of Fig. 1, the section being taken on the line 4 of Fig. 1. Fig. 5 is a side view, partly in section, of a sealed tumbler.

The cap 31 has a downwardly-facing annular groove 32, formed in its upper portion, below which is the substantially cylindrical portion 30 and below that the flaring portion 33, which serves to compress the gasket 26 at an angle against the rounded rim 22 of the tumbler 21. The cross-section of the gasket 26, herein shown, is approximately that of a rhomboid or rhombus, the two opposite parallel sides of which are coincident with the cylindrical inner and outer faces of the gasket. The flange of the cap below the flaring portion has indentations 34 placed at intervals around its circumference. These indentations are made deep enough at their upper ends to separate portions of the flange from the adjacent body of the flange, so as to form the semidetached spurs, which project inwardly and form a series of shoulders or supports for the lower portion 28 of the gasket, which rests between the spurs 34 and the adjacent surface of the flange. The lower edge 35 of the cap is preferably turned inwardly in order to give it a finished appearance and to make a smooth and uniform joint around the tumbler. The gasket may be inserted into the cap at any convenient time prior to the placing of the cap on the tumbler 21, and when so inserted it is securely held in the cap by the spurs 34, so that the combined cap and gasket may be handled and shipped without danger of separation.

The top of the cap 31 is provided with a downwardly-facing groove 32, into which fits the top edge 40 of the inner holder 39. The inner holder coöperates with the adjacent surface of the cap in forming a recess which accommodates the upper portion 27 of the gasket. The gasket is thus held securely within the cap in such relation to the cap and tumbler-rim that it cannot escape being carried downward and over the outer edge of the tumbler-rim 22 by the flaring portion 33 when pressure is applied to the cap, the inner holder 39 moving downward at the same time with the cap.

The jars are herein shown to be filled with sliced meat, represented by the lines 37.

The inner support 39 not only assists to retain the gasket in place, but it also serves a useful purpose in covering the contents of the jar and keeping the cap and contents from coming in contact with each other, thereby preventing either one from injuriously affecting the other. The support may be made of paraffined or waterproofed paper, glass, sheet metal, or other suitable material. When made of sheet metal, the metal should either be non-corrosive or be protected by a coating of suitable lacquer or enamel.

In order to still further secure the gasket within the cap, the spurs 34 may be pressed back toward the flange after the gasket has been put into place, thus pinching the gasket against the flange and increasing the security of its position in the cap.

In the ordinary hot processing of fruits and other goods the filled jar with the cap and gasket in place is put into a steam-chamber and cooked or heated. During this time the cap is held down by some extraneous means to prevent it from being misplaced by the air which is forced out of the receptacle by the action of the heat. At such times the gasket is liable to be forced outwardly beyond the rim of the cap by the outgoing air, and thus displaced from its proper sealing position. With the present invention the spurs 34 effectually prevent this outward movement of the gasket, so that the parts are kept in position to insure an effectual seal.

I claim as my invention—

1. A hermetic closure comprising a cap having a flaring internal seat, a band-shaped lining-gasket therefor, and a holder coöperating with the cap to form an annular groove for the upper edge of the gasket, the cap being indented in its lower portion to receive the lower edge of the gasket.

2. The combination of a receptacle having a sealing-seat, a cap having a flaring internal seat, a band-shaped lining-gasket therefor, and a holder coöperating with the cap to form an annular groove for the upper edge of the gasket, the cap being indented in its lower portion to receive the lower edge of the gasket.

3. The combination with a gasket, of a cap provided with indentations comprising portions of the flange of the cap which have been partially separated from their adjacent portions of the flange, to support the gasket.

4. The combination with a gasket, of a cap provided with indentations comprising portions of the flange of the cap which have been partially separated from their adjacent portions of the flange, to support the gasket and pinch it against the flange.

5. A closure for hermetically-sealed receptacles, comprising a gasket having an approximately cylindrical face and an adjacent face forming an oblique angle therewith, and a cap having gasket-supporting indentations partially separated from the cap-rim, and having a gasket-receiving seat, a portion of which is inclined in substantial accordance with the oblique face of the gasket.

6. The combination with a receptacle, of a hermetic sealing-closure comprising a gasket having an acute-angled edge which projects at an inclination downwardly and across the sealing-seat of the receptacle, and a cap having gasket-supporting indentations partially separated from the cap-rim, and having an inclined sealing portion for wedging the gasket against the sealing-seat of the receptacle.

7. The combination with a receptacle having a rounded rim, of a self-centering closure therefor, comprising a cap having a flexible flaring flange, a gasket, the upper portion of which is smaller than the outer diameter of the receptacle-rim, and having lower faces which converge downwardly at an acute angle and project between the rounded rim and the cap-flange, the lower portion of the cap-flange being turned inwardly beneath the gasket to engage the receptacle and center the closure therewith.

8. A hermetic closure for receptacles having a rounded rim, comprising a gasket having an outside diameter larger than that of the receptacle rim, provided with a downwardly and outwardly inclined lower surface disposed to rest upon the said rim, and having an acute-angled lower outer corner, which in the uncompressed condition of the closure projects outside of the said rim, and a cap having a flexible flange provided with an annular seat for receiving the outside of the said gasket, portions of the flange being turned inwardly beneath the gasket to center the closure with the receptacle.

9. The combination with tumblers and similar receptacles having a rounded rim, of a hermetic closure comprising a cap provided with a flexible flange having an annular gasket-seat substantially larger in diameter than the tumbler-rim, and a gasket in said seat having in its uncompressed condition, a downwardly and outwardly inclined lower surface resting on the said rim with its lower outer edge projecting below the level of the rim, and in its compressed condition sustaining the entire atmospheric pressure upon the cap, portions of the cap-flange being turned inwardly beneath the gasket to engage the receptacle and center the closure therewith.

10. The combination with a tumbler or similar receptacle having a rounded rim, of a hermetic closure therefor consisting of a cap provided with a flexible flange having an annular portion substantially larger in diameter than the receptacle-rim, and extending a substantial distance below the level of the rim, and a gasket seated in said cap and having a downwardly and outwardly inclined lower edge resting upon the said rim and having, in its uncompressed condition, an acute-angled outer lower corner projecting into the annular space between the rim and the enlarged portion of the cap-flange, portions of the said flange being turned inwardly beneath the gasket to engage the receptacle and center the closure therewith.

In testimony whereof I have signed my name to this specification in the presence of two subscribing witnesses.

WILLIAM A. LORENZ.

Witnesses:
JAS. W. GREEN,
H. MALLNER.